US010258026B2

(12) United States Patent
Thomas (10) Patent No.: US 10,258,026 B2
(45) Date of Patent: Apr. 16, 2019

(54) ROD HOLDER ASSEMBLY AND METHOD OF USING THE SAME (71) Applicant: Jeffrey Scott Thomas, Dunn, NC (US)

(72) Inventor: Jeffrey Scott Thomas, Dunn, NC (US)

(*) Notice: Subject to any disclaimer, the term of this patent is extended or adjusted under 35 U.S.C. 154(b) by 19 days.

(21) Appl. No.: 14/821,169

(22) Filed: Aug. 7, 2015

(65) Prior Publication Data

US 2016/0037762 A1 Feb. 11, 2016

Related U.S. Application Data (60) Provisional application No. 62/035,154, filed on Aug. 8, 2014.

(51) Int. Cl.
| A01K 97/10 | (2006.01) |
| F16C 11/10 | (2006.01) |
| F16M 11/10 | (2006.01) |
| F16M 11/20 | (2006.01) |
| F16M 13/02 | (2006.01) |

(52) U.S. Cl.
CPC .............. *A01K 97/10* (2013.01); *F16C 11/10* (2013.01); *F16M 11/10* (2013.01); *F16M 11/2014* (2013.01); *F16M 13/02* (2013.01); *F16M 2200/024* (2013.01)

(58) Field of Classification Search
CPC ........ A01K 91/08; A01K 97/10; F16M 11/08; F16M 11/2014; F16M 2200/024
USPC ........................................................ 43/21.2
See application file for complete search history.

(56) References Cited

U.S. PATENT DOCUMENTS

| 3,246,865 | A | * | 4/1966 | Latimer | .................. | A01K 97/10 |
| | | | | | | 248/515 |
| 4,827,654 | A | * | 5/1989 | Roberts | .................. | A01K 97/10 |
| | | | | | | 248/514 |
| 5,054,737 | A | * | 10/1991 | DeLancey | .............. | A01K 97/10 |
| | | | | | | 248/515 |
| 5,121,565 | A | * | 6/1992 | Wille | ..................... | A01K 97/10 |
| | | | | | | 43/21.2 |
| 5,142,809 | A | * | 9/1992 | O'Brien | ................. | A01K 97/10 |
| | | | | | | 248/514 |
| 5,299,773 | A | * | 4/1994 | Bertrand | ................. | B63B 45/00 |
| | | | | | | 248/292.12 |
| 5,367,815 | A | * | 11/1994 | Liou | ...................... | A01K 97/10 |
| | | | | | | 248/514 |
| 5,438,789 | A | * | 8/1995 | Emory | .................... | B63B 17/00 |
| | | | | | | 248/514 |
| 5,722,630 | A | * | 3/1998 | Chu | ........................ | A01K 97/10 |
| | | | | | | 248/514 |
| 5,761,844 | A | * | 6/1998 | Horschel | ............... | A01K 97/10 |
| | | | | | | 248/131 |
| 5,871,196 | A | * | 2/1999 | Martelli | ................. | A01K 97/10 |
| | | | | | | 248/514 |

(Continued)

Primary Examiner — Eret C McNichols (57) ABSTRACT

Herein described is a rod holder assembly for holding a rod in a desired orientation that is manually adjustable about the horizontal and vertical axes (singlehandedly and substantially synchronously) and is capable of a variety of tension settings allowing for a degree of rotational movement about the horizontal and/or vertical axes in response to external forces or substantially no rotational movement. Also described is a rod holder assembly that may be easily and conveniently converted to a mount for other objects. A method for using the rod holder assembly is also described.

27 Claims, 10 Drawing Sheets

(56) References Cited

U.S. PATENT DOCUMENTS

| | | | | |
|---|---|---|---|---|
| 6,052,937 A * | 4/2000 | Morong | A01K 97/10 43/21.2 |
| 6,505,431 B1 * | 1/2003 | Christian | A01K 91/08 43/19.2 |
| 6,561,476 B2 * | 5/2003 | Carnevali | F16M 11/14 248/181.1 |
| 6,591,541 B1 * | 7/2003 | Cummings | A01K 97/10 248/514 |
| 6,637,146 B2 * | 10/2003 | Ernst | A01K 97/10 248/514 |
| 6,941,694 B2 * | 9/2005 | Ernst | A01K 97/125 43/17 |
| 6,974,113 B1 * | 12/2005 | Clark | A01K 97/10 248/521 |
| 6,978,570 B1 * | 12/2005 | Clark | A01K 91/08 114/255 |
| 7,007,906 B2 * | 3/2006 | Slatter | A01K 91/08 114/255 |
| 7,025,315 B2 | 4/2006 | Carnevali | |
| 7,114,281 B2 * | 10/2006 | Miller | A01K 97/10 43/21.2 |
| 7,296,377 B2 * | 11/2007 | Wilcox | A01K 97/10 114/255 |
| 7,320,450 B2 | 1/2008 | Carnevali | |
| D564,062 S | 3/2008 | Carnevali | |
| 7,406,795 B1 * | 8/2008 | Follmar | A01K 97/10 248/534 |
| 7,774,973 B2 | 8/2010 | Carnevali | |
| 7,849,630 B2 | 12/2010 | Carnevali | |
| 8,024,886 B2 * | 9/2011 | Sutherland | A01K 97/10 248/514 |
| 8,141,839 B2 * | 3/2012 | Buchner | E04H 12/2269 248/229.15 |
| 8,608,120 B2 | 5/2013 | Chen et al. | |
| 8,800,196 B2 * | 8/2014 | Baumann | A01K 97/10 248/534 |
| 9,326,496 B2 * | 5/2016 | Chmura | A01K 97/10 |
| 9,933,109 B2 * | 4/2018 | Moore | F16M 13/02 |
| 2001/0046409 A1 * | 11/2001 | Fischer | B60R 11/02 403/92 |
| 2006/0027725 A1 * | 2/2006 | Lin | F16C 11/10 248/534 |
| 2008/0022578 A1 * | 1/2008 | Follmar | A01K 97/10 43/21.2 |
| 2009/0211141 A1 * | 8/2009 | Marcus | A01K 97/10 43/21.2 |
| 2009/0224122 A1 * | 9/2009 | Liao | B60R 11/0252 248/292.13 |
| 2014/0112702 A1 * | 4/2014 | Mighells | F16C 11/10 403/92 |
| 2015/0320025 A1 * | 11/2015 | Pruett | A01K 91/053 43/42.74 |
| 2016/0255823 A1 * | 9/2016 | Thomas | A01K 97/10 |
| 2016/0356415 A1 * | 12/2016 | Moore | F16M 13/02 |

* cited by examiner

ROD HOLDER ASSEMBLY AND METHOD OF USING THE SAME

CROSS REFERENCE TO RELATED APPLICATIONS

This application claims priority to U.S. Provisional Patent Application Ser. No. 62/035,154 filed Aug. 8, 2014. The disclosure of Application Ser. No. 62/035,154 is incorporated by reference herein in their entirety.

FIELD

Herein described is a rod holder assembly that securely holds a fishing rod in a desired orientation. The assembly may be singlehandedly adjusted about a horizontal axis and/or vertical axis via substantially synchronous movements. The rod holder assembly also may be converted into a mount for other objects requiring adjustability.

BACKGROUND

Fishing is a popular activity frequently enjoyed on the water in watercraft of some form. The types of watercraft used for fishing is diverse and includes stand-up paddle boards, sea kayaks, canoes, and, of course, traditional open hulled motorized vessels of all sizes. Anglers who prefer to fish from watercraft have employed a variety of ways to secure their fishing rods while traveling from point to point or while fishing thereby freeing up hands to perform other tasks. For example, rod holders have been used in such a manner for many years and, depending on the vessel's design, there are many structures, surfaces, and other features that may serve as potential mounting locations for rod holders. Vertical and horizontal rails, flat surfaces such as decks and gunwales, and mounting tracks arranged on the decks are all possible mounting locations for rod holders.

As mentioned above, rod holders are known in the art a few of which are manually adjustable. However, commercially available rod holders are not easily, conveniently, or efficiently adjusted. For example, they typically require two hands to operate and lock in position as the user to manually hold the rod holder at the desired angle with the one hand and simultaneously manipulate tensioning thumb screws or the like with the other. Some rod holders are adjustable about either the horizontal (the angle of the rod holder with respect to the horizontal plane) or vertical axes (certain degree of rotation about the vertical axis to alter the direction in which the rod holder and thus the rod is pointed) but not both. For the rod holders that are adjustable about the horizontal and vertical axes, the dual adjustments must be made independently and incrementally as opposed to a substantially synchronous single handed operation. Moreover, known commercially available rod holders are not equipped with multiple tension settings allowing the user to substantially lock the holder at a desired angle with little to no change in orientation in response to strong external forces or allowing for a degree of give or slippage in the positioning when sufficient torque from an external force is applied. Finally, known commercially available rod holders are not easily and conveniently convertible to mounts for other objects requiring stability and adjustability.

Therefore, an adjustable fishing rod holder that allows a user to singlehandedly and synchronously pivot the holder about a horizontal axis to a desired angle and rotate the holder about a vertical axis is desired. Furthermore, an adjustable fishing rod holder that allows a user to secure the holder in a substantially fixed position such that the desired angle is maintained upon application of torque and/or set the holder to slippage upon application of a certain degree of torque is also desired. Moreover, a rod holder that is capable of being mounted on a variety of features, surfaces, and structures on a watercraft is desired. Also, a rod holder that is easily and conveniently convertible to another mount for other objects requiring stability and adjustability is desired.

SUMMARY

The present invention is directed to a rod holder assembly for holding a rod in a desired orientation that is manually adjustable about the horizontal and vertical axes (singlehandedly and substantially synchronously) and is capable of a variety of tension settings allowing for a degree of rotational slippage about the horizontal and/or vertical axes in response to strong external forces or substantially no rotational slippage. In one embodiment, the rod holder assembly may comprise a rod receiver which, in some embodiments, is substantially tubular or cylindrically shaped. In a preferred embodiment, the rod receiver receives most of, if not all of, the handle of contemporary fishing rods.

In some embodiments, the rod holder assembly further comprises at least a first gear assembly and a second gear assembly. In one embodiment said first gear assembly governs rotational movement about the horizontal axis and second gear assembly governs rotational movement about the vertical axis. First and second gear assemblies may comprise housing elements that engage one another via surfaces that may comprise complementary and mating protrusion and depression arrays. Tight engagement of housing elements and their respective mating protrusion and depression arrays results in rotational resistance to torque applied by external forces about the horizontal and/or vertical axes.

First and/or second gear assemblies may, in some embodiments, further comprise resilient members for application of tension between housing elements and mating protrusion/depression arrays. In one embodiment, the resilient member may be a retention spring, but other resilient members may be used. First and/or second gear assemblies may also comprise resilient member retention elements for retaining the resilient member and holding it in position.

First and/or second gear assemblies may further comprise a locking mechanism for additional compression of resilient member and tension between housing elements and mating protrusion/depression arrays. The locking mechanism furthermore, may reduce the amount of space between locking mechanism components rendering disengagement of first protrusion and depression arrays substantially prohibited. In some embodiments, locking mechanism may work without the need for resilient member compression.

In some embodiments, the locking mechanism may comprise a shaft with locking protrusions which engage and interact with locking channels in a receptacle for said shaft. The receptacle may engage only a second end of the shaft with locking protrusions and may be on the opposite side of the housing elements from a first end of said shaft. In some embodiments, the locking channels may comprise variant locking positions as either the shaft or the receptacle is rotated about the horizontal axis. In other embodiments, locking mechanism may comprise a ball detent pin and a ball detent receiver or a threaded shaft and cam lever.

In some embodiments, second gear assembly may comprise a second protrusion array and a second depression array. In one embodiment, second protrusion array may be on the lower surface of one of the housing elements which, in some embodiments, may also be a component of the first gear assembly. Second depression array which mates with second protrusion array, in some embodiments, may be positioned on an upper surface of a mounting platform. Second gear assembly may further comprise a resilient member retention element that, in some embodiments, comprises a threaded shaft and a resilient member support.

In some embodiments, the rod holder assembly may comprise a mounting mechanism. In one embodiment, said mounting mechanism may comprise a flush mount design, an anchor design, a rail or bar mount design, and a substantially concealed elevating mount design.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

Embodiments of the invention will now be described, by way of example, with reference to the accompanying drawings, in which.

Like reference numerals refer to like parts throughout the various views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "first," "second," "left," "rear," "right," "front," "vertical," "horizontal," and derivatives thereof shall relate to the invention as oriented in FIGS. 1-11. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

It should be noted that although the discussions herein may refer to a specific order and composition of method steps, it is understood that the order of these steps may differ from what is described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on designer choice and it is understood that all such variations are within the scope of the invention.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this invention as required by 35 U.S.C. § 112.

Referring now to FIGS. 1-11, an adjustable rod holder assembly 100 is shown. In one possible embodiment, the rod holder assembly 100 receives a fishing rod and a user manually adjusts the rod holder assembly to a desired orientation. The user may make said adjustments using one hand and synchronous motion. In some embodiments, once the desired orientation has been achieved, the rod holder assembly 100 may be set to allow the angle to slip and change in response to sufficient torque from an external force or alternatively the rod holder assembly may be substantially locked in place such that the angle is virtually unchanged upon application of similar torque on the components.

Figures 1A, 1B, 1C:
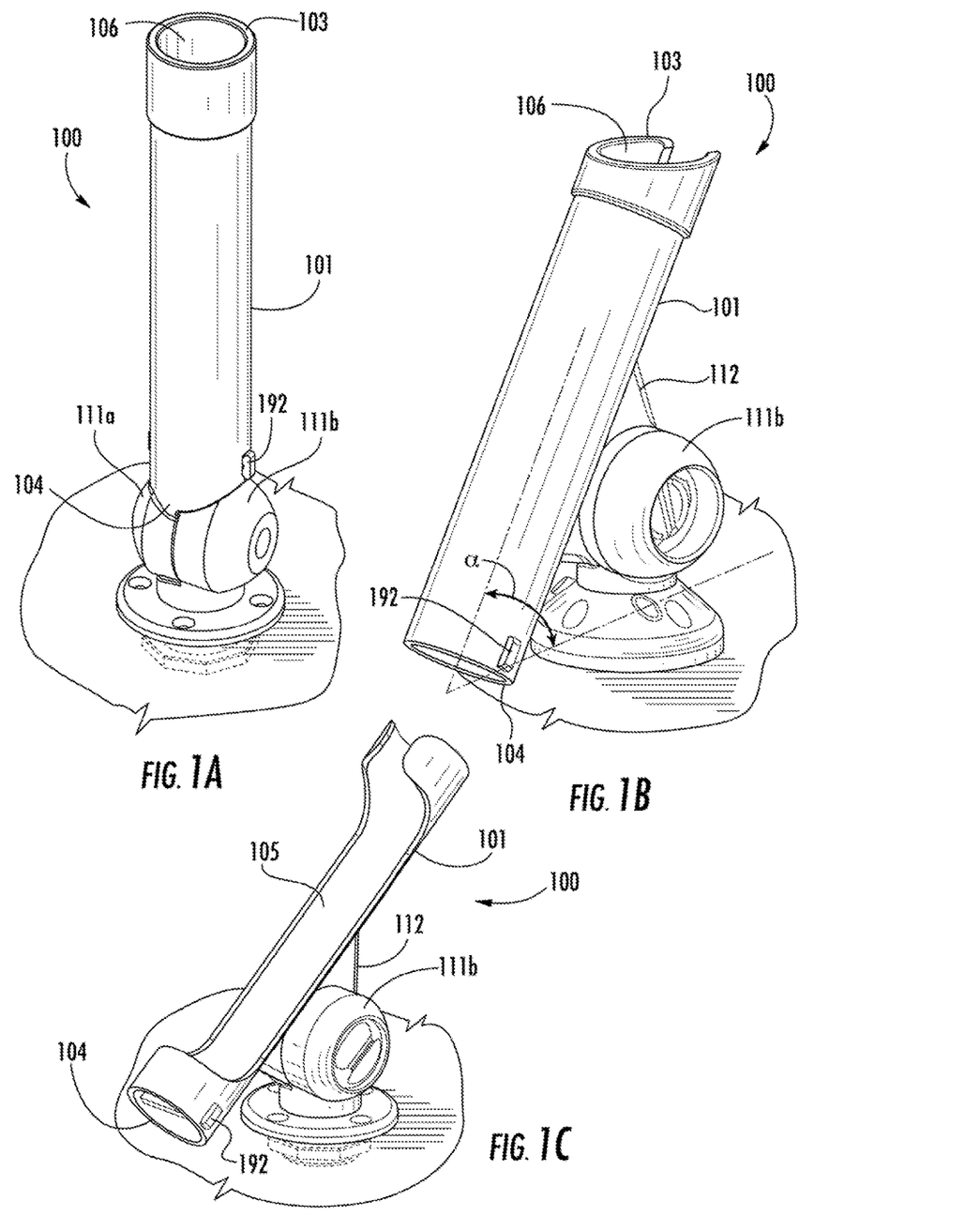
FIG. 1A-C illustrates perspective views of fully assembled exemplary adjustable fishing rod holder assemblies.

Referring now to FIG. 1, the rod holder assembly 100 may comprise a rod receiver 101 for receiving and supporting a fishing rod. In the embodiment depicted in FIG. 1, rod receiver 101 comprises a cylindrically shaped tube 102 having a distal end 103, a proximal end 104, a cavity 105, and an opening 106. Those of skill in the art will understand that rod receiver 101 may be sized and dimensioned to receive various types and sizes of fishing rods.

In one embodiment, a fishing rod may be telescopically inserted into opening 106 of distal end 103 of rod receiver 101—handle end first. Rod receiver 101 may be sized to form a snug fit around the fishing rod handle or, alternatively, rod receiver cavity 105 may be sized such that a gap exists between the exterior surface of the rod handle and the interior surface of cavity 105. Suitable materials for the rod receiver 101 may include, without limitation, a rigid polymer, polyvinyl chloride, polyurethane, a metal, rubber, and wood. Rod receiver 101 may be equipped with an insert 192 that, in some embodiments, supports the handle of a fishing rod or other object to avoid interference with other components.

As stated previously, rod holder assembly 100 may be adjustable so that the user may point rod receiver 101 and thus the fishing rod itself as desired along a 360 degree arc about a vertical axis. In some embodiments, the user may adjust the rod holder assembly 100 by tilting the rod receiver 101 to a desired orientation in relation to a horizontal axis (e.g. deck surface, water surface). Manual manipulation or adjustment of the rod receiver about the vertical and/or horizontal axes is accomplished, in some embodiments, by one or more gear assemblies.

Figures 2A, 2B, 2C:
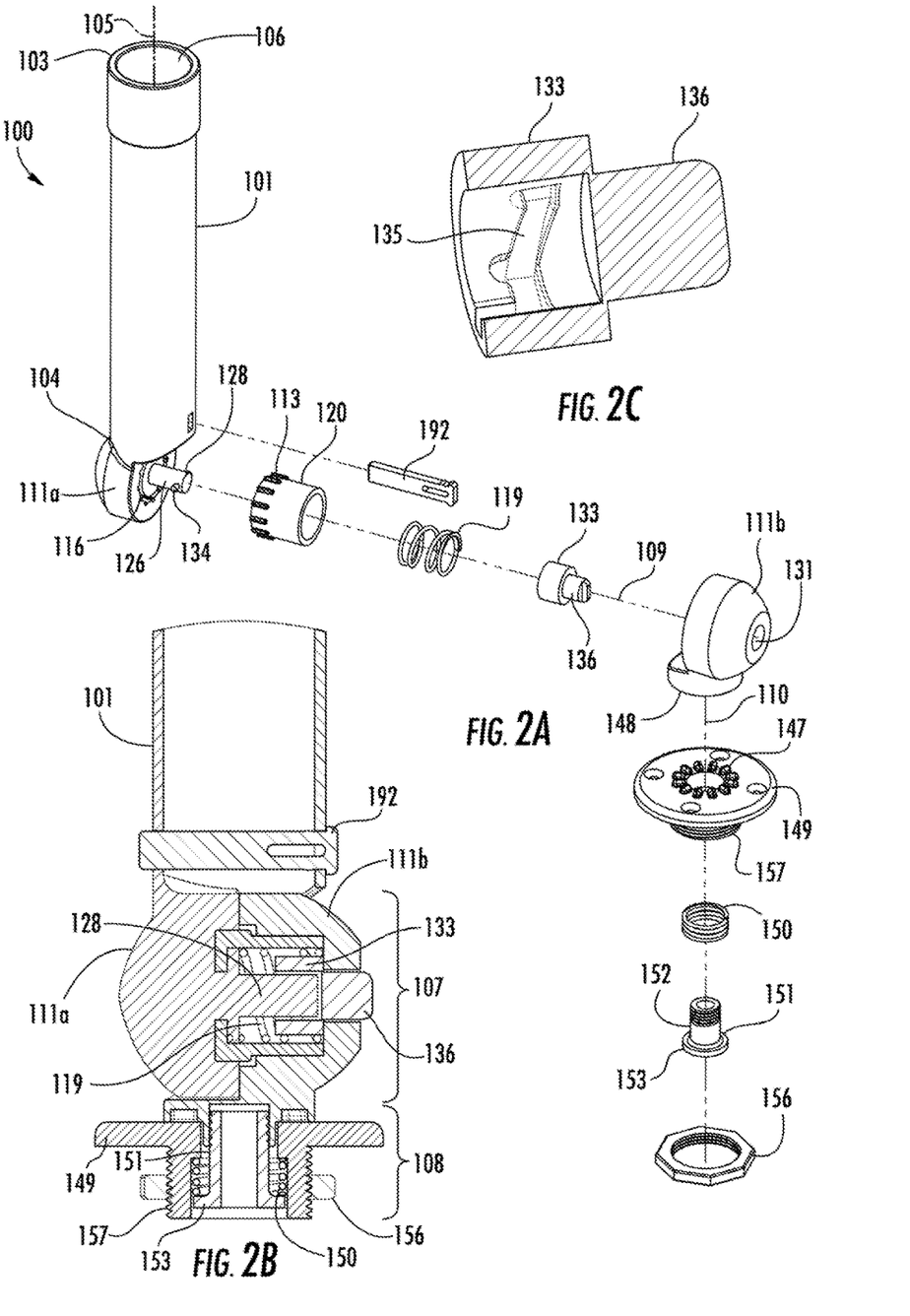
FIG. 2A-C illustrates an embodiment of an adjustable fishing rod holder assembly with shaft and locking receptacle locking mechanism.

Referring now to FIG. 2, in one embodiment, the rod holder assembly 100 is equipped with at least a first gear assembly 107 and a second gear assembly 108. Said first gear assembly 107 may govern movement of the rod holder assembly 100 and, thus the rod receiver 101 about the horizontal axis—defined in this embodiment by dotted line 109 in FIG. 2A. In the same embodiment, second gear assembly governs movement of the rod holder assembly 100 about the vertical axis, which is defined in this embodiment by dotted line 110 in FIG. 2A.

With continued reference to the embodiment shown in FIG. 2, rod holder assembly 100 may comprise a two-piece housing 111 which houses various components of the assembly including, for example, tensioning and/or locking mechanism, first gear assembly, and part of second gear assembly. Two-piece housing may, in some embodiments, comprise a first housing element 111a and a second housing element 111b. As shown in FIG. 2, rod receiver 101 may be affixed to upper surface of housing element 111a, but it should be recognized by those of skill in the art that rod receiver 101 may be engaged to either housing elements [111a, 111b] as the components may be reversed. In an alternative embodiment illustrated in FIGS. 1B-C, a brace 112 mediates between rod receiver 101 and housing 111. In this embodiment, brace 112 is affixed to both rod receiver 101 and housing 111.

It should be understood that, in some embodiments, rod receiver 101 and housing element 111a may be removed and replaced with another substitute housing element that serves as a mount for other objects requiring adjustability, such as a fish finder, camera and the like. Such substitute housing elements may be null mount housing elements adaptable to support a variety of objects. Such substitute housing elements may comprise threaded holes or shafts for attaching said objects. Such conversion methods may be very simple and convenient to the user requiring minor adjustments. For example, in the embodiment in FIG. 9-10, the user may merely grip the rod receiver 101 and activate a first housing release mechanism by rotating the turn knob 144 to the proper channel in locking receptacle located in housing element 111a. Housing element 111a may then be removed and conveniently replaced with another.

Figures 4A, 4B:
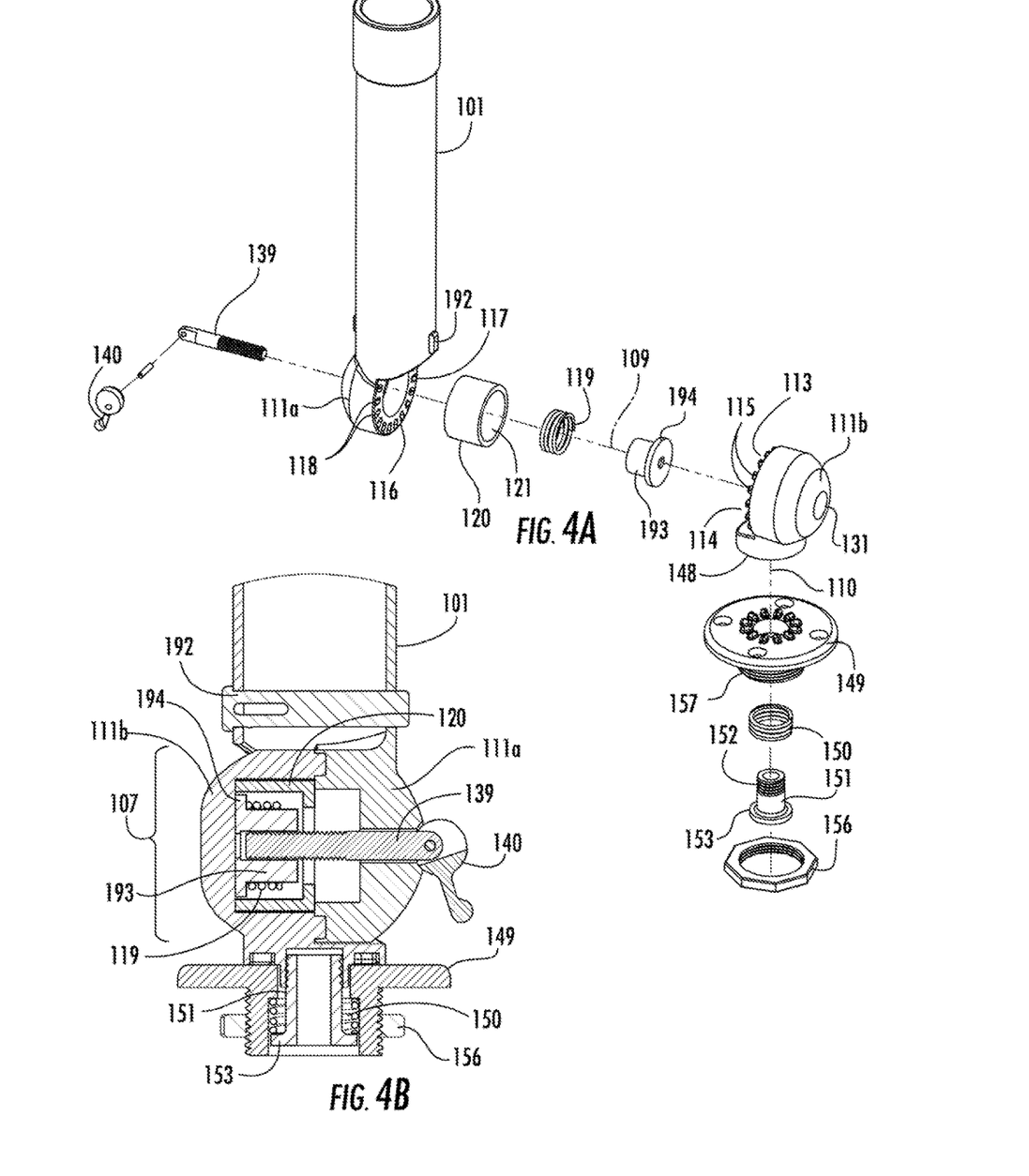
FIG. 4A-B illustrates an embodiment of an adjustable fishing rod holder assembly with threaded shaft, cam and lever locking mechanism.
Figures 5A, 5B, 5C:
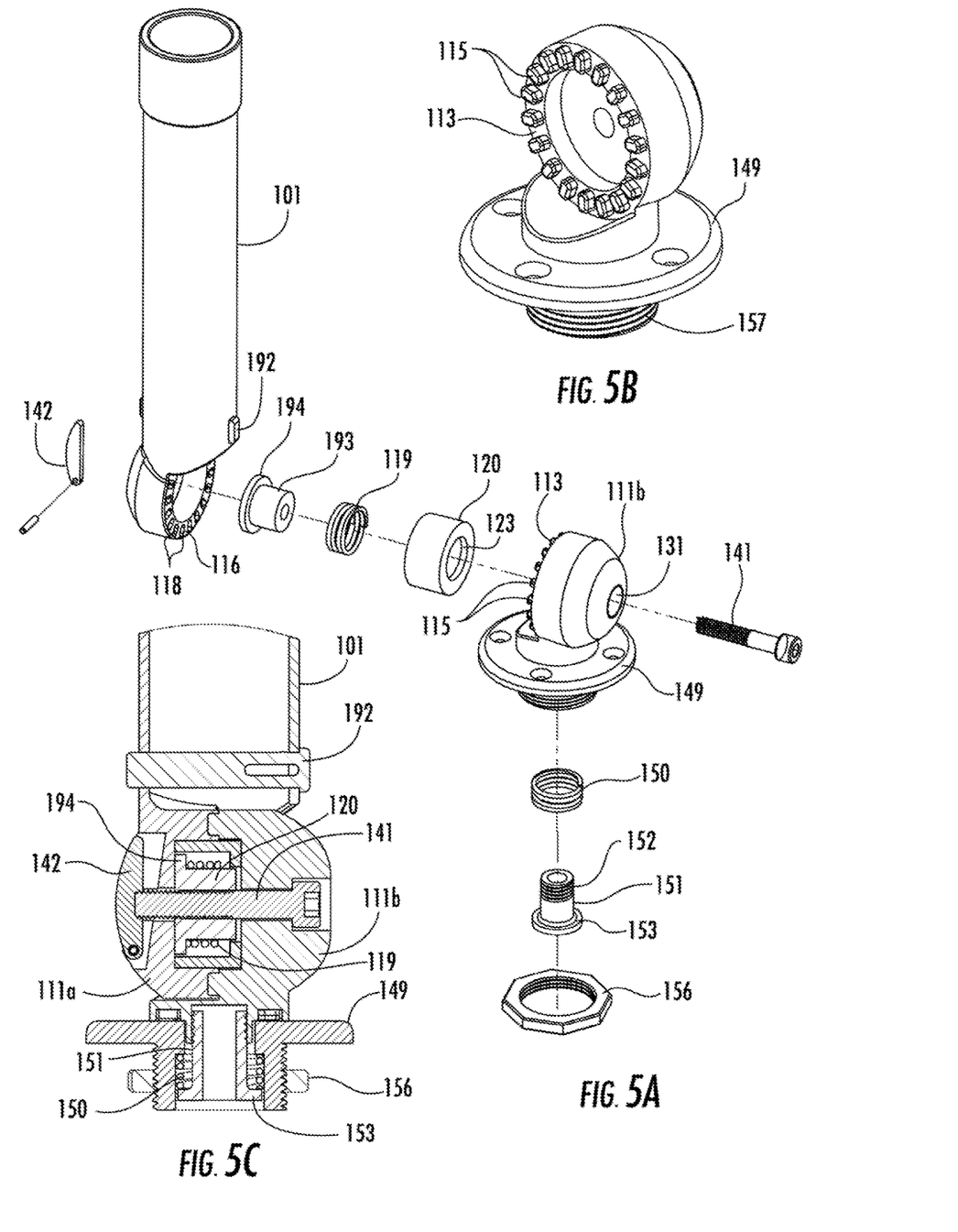
FIG. 5A-C illustrates an alternative embodiment of an adjustable fishing rod holder assembly with threaded shaft, cam and lever locking mechanism.

Turning now to FIGS. 4-5 by way of example, first gear assembly 107 may comprise a first protrusion array 113 which, in this embodiment, is positioned on left lateral surface or face 114 of housing element 111b. First protrusion array 113 is defined by a plurality of protrusions 115. First gear assembly 107 may further comprise oppositely disposed first depression array 116 which, in this embodiment, is positioned on right lateral surface or face 117 of housing element 111a. First depression array 116 is defined by a plurality of depressions 118. First protrusion array 113 and first depression array 116 are complementary and configured for mating between opposing protrusions 115 and depressions 118 with a fit that substantially hinders rotational movement as between the components. Alternative patterns and distribution of protrusion and depression arrays upon the housing element faces (or other components of first gear assembly as described in more detail below) are contemplated herein. Furthermore, alternative sizes and shapes (geometries) of the protrusions and depressions themselves are contemplated. As explained in more detail below, housing element 111a and housing element 111b (and thus first protrusion array 113 and first depression array 114) selectively move between an engaged, unitary configuration and a disengaged configuration. Suitable materials for the housing elements, first protrusion array 113 and first depression array 116 may include, without limitation, a rigid polymer, polyvinyl chloride, polyurethane, a metal, and fiberglass.

In some embodiments, protrusions 115 and depressions 118 engage each other through a meshing interaction which, when fully engaged, results in a stable first gear assembly configuration substantially limiting rotational movement between housing elements 111a and 111b in response to an external force such as, for example, a large fish strike. When protrusions 115 and depressions 118 are disengaged, the user may manually and singlehandedly (if preferred) rotate housing element 111a about horizontal axis 109 resulting in modification of the rod receiver's angle $\alpha$, and thus also the fishing rod, in relation to the horizontal plane.

In some embodiments, interchanging the shapes of the plurality of horizontal protrusions 115 and the plurality of horizontal depressions 118 at least partially affects the amount of torque required to achieve rotational movement between housing elements and arrays. The plurality of horizontal protrusions 115 and the plurality of horizontal depressions 118 form a shape that may include, without limitation, a substantially square shape, an arc shape, and a triangle shape. Those skilled in the art will recognize that the greater the curvature of the horizontal protrusions and depressions the greater opportunity of slippage. Moreover, the numbers of protrusions and depressions do not need to match on a one to one scale. In one possible embodiment, the horizontal protrusions 115 may include raised dimples that mesh with depressions 118 having similarly shaped hollows in the opposing surface of the first depression array 116. In one embodiment, multiple geometries may be used in place of the round dimples/hollows to accommodate desired torque.

As shown in the embodiment illustrated in FIGS. 4-5, first gear assembly 107 may further comprise a first resilient member 119 that may be collinear with axis 109, for example, a coil spring, a rubber band, a tension spring, a volute spring, a torsion bar that is wound up a spring, or the like. First resilient member 119, in this embodiment, provides tension between housing element 111a and housing element 111b biased toward engagement between the housing elements in its normal state (e.g., expanded). Thus, in some embodiments, when the user wishes to change the angle $\alpha$ of the rod receiver 101 in relation to the horizontal plane and disengages housing element 111a from element 111b to make the adjustment (by, for example, gripping rod receiver and pulling housing element 111a away from housing element 111b), upon release, first resilient member 119 expands back to its natural state forcing housing elements 111a, 111b back together reengaging protrusions and depressions as first resilient member returns to a normal tension from a compressed state. It should be noted that engagement of first protrusion array 113 with first depression array 116 through first resilient member 119 tension alone, in some embodiments, results in a semi-locked configuration wherein a degree of rotational movement (e.g., slippage or give) is allowed between housing element 111a and housing element 111b depending on strength of the external force applied. First protrusion array 113 and first depression array 116 may be interchangeable so as to provide variously shaped and dimensioned horizontal protrusions 115 and depressions 118. In this manner, slippage between first protrusion array 113 and first depression array 116 may be adjusted to compensate for the strength of the external force expected.

Two-piece housing 111 may further comprise a resilient member retention element 120 such as the spring retainer in the embodiment shown in FIGS. 2-5 and 9-10. It should be recognized that resilient member 119 and retention element 120 may be affixed to (or merely engaged with) either housing element 111a or housing element 111b. As shown in the embodiment illustrated in FIG. 2, resilient member retention element 120 may be engaged to housing element 111b by various methods known in the art including without limitation gluing, mechanical fastening, plastic welding techniques, or the like. Alternatively, one or both components may be separate and independent of the housing elements and assembled together with the housing elements. In the embodiments shown in FIGS. 2-5 and 9-10, resilient member 119 and retention element 120 are assembled within housing element 111b. Resilient member 119 may rest within an interior chamber 121 of retention element 120 through aperture 122 upon ridge or ledge 123 formed, for example, 360 degrees about the interior surface. Chamber 121 provides a surface and space for the resilient member 119 to expand and compress as a user makes manual adjustments between housing elements 111a, 111b.

In some embodiments, such as the embodiment shown in FIG. 4-5, first gear assembly may comprise a post 193 with base 194 for supporting first resilient member 119 which works cooperatively with resilient member retention element 120 to capture resilient member 119. In this embodiment, post 193 inserts into and through resilient member 119 and into retention element 120. In some embodiments, the entire assembly may then be engaged to and/or affixed to either housing element 111b (as in the embodiment shown in FIG. 4) or housing element 111a (as in the embodiment shown in FIG. 5). If affixed, the contact point between housing element and retention element 120 may be via glue and weld or the like.

Figures 3A, 3B:
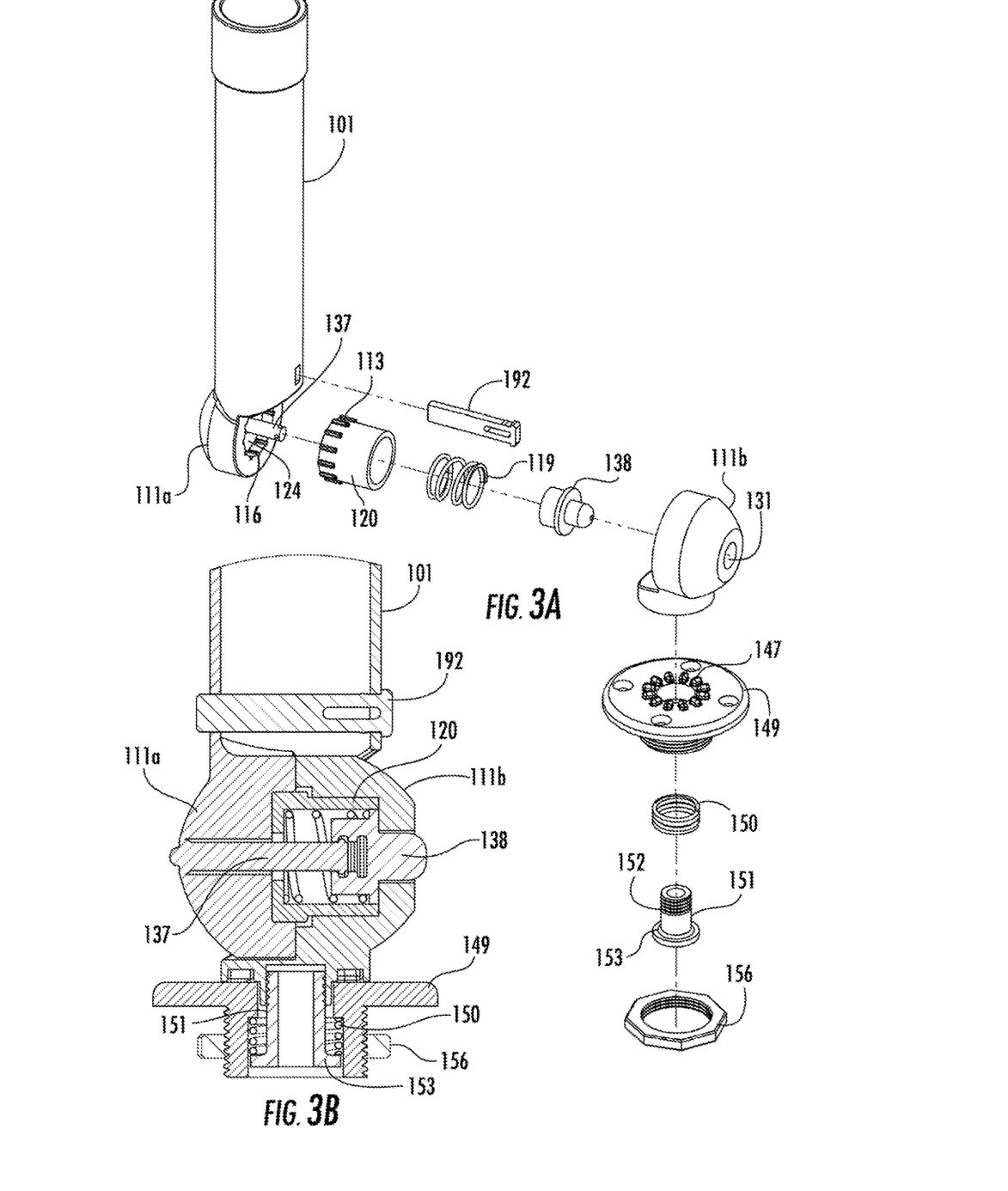
FIG. 3A-B illustrates an embodiment of an adjustable fishing rod holder assembly with ball detent locking mechanism.

As mentioned above, first protrusion array 113 and first depression array 116 may be positioned on other components of the assembly than left and right lateral faces of housing elements 111a, 111b. For example, in FIGS. 2-3, first protrusion array 113 is shown as positioned about the exterior surface of resilient member retention element 120 (proximate the end closest housing element 111a). First depression array 116 is positioned within housing element 111a about a mating channel 124. First protrusion array 113 and/or first depression array 116 may be combined with (as a single component) with resilient member retention element 120 in other configurations, such as shown in FIG. 3.

Figures 9A, 9B, 9C:
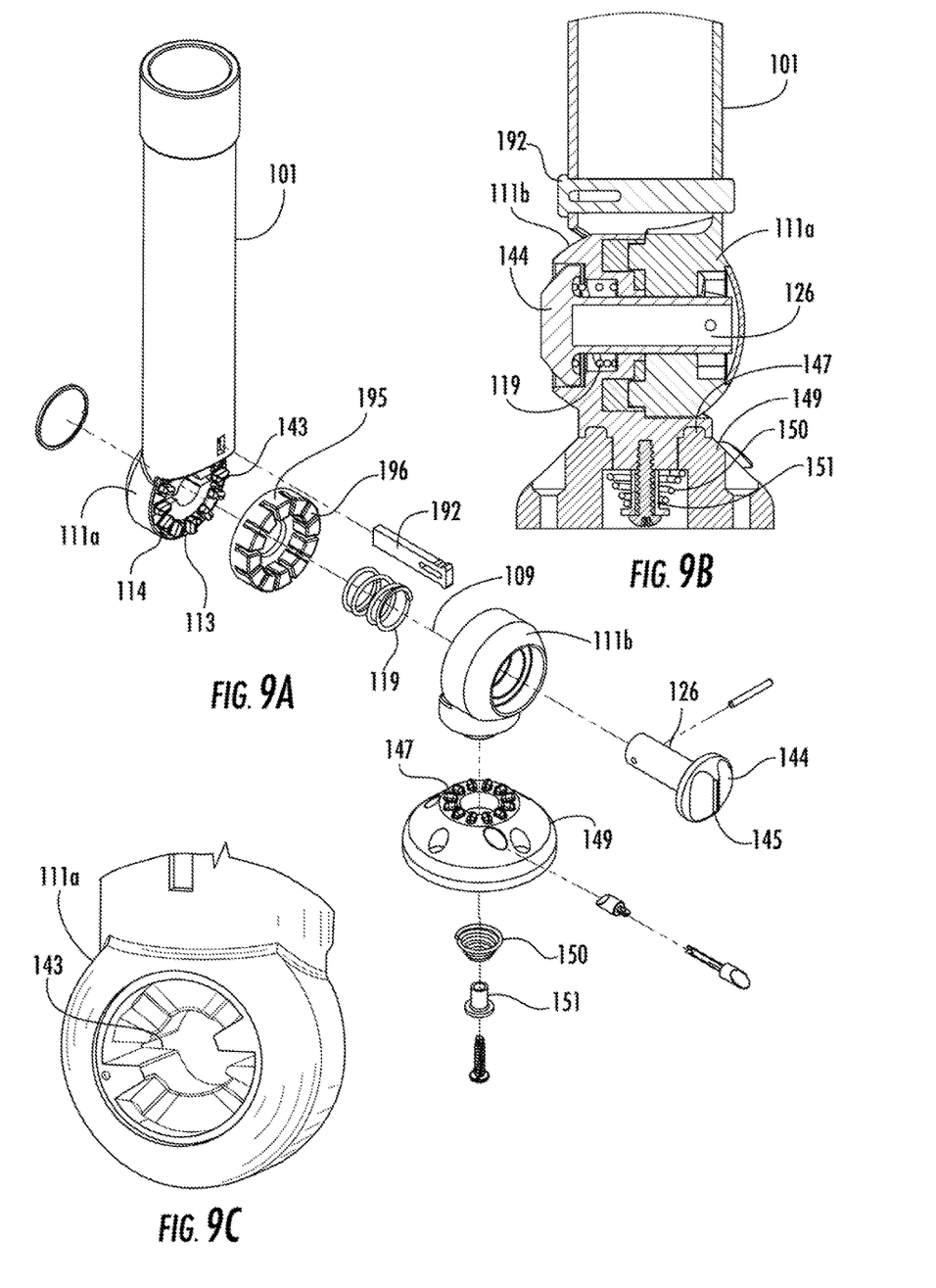
FIG. 9A-C illustrates an embodiment of an adjustable fishing rod holder assembly.

In some embodiments, the resilient member retention element 120 may be an integral feature of another component within the gear assembly. In FIG. 9, for example, the resilient member retention element 120 is not an independent component but rather is built in to housing element 111a. In FIG. 9, the spring is sandwiched between the built in retention element 120 within housing element 111a and the turn knob 144, discussed below. Another feature shown in the embodiment illustrated by FIG. 9 is a shock dampening insert 196. In this embodiment insert 196 is a sleeve having complementary depressions 195 to the depressions formed on the left lateral surface of housing element 111b. Insert 196 engages the first depression array in left lateral face of element 111b which absorbs energy and reduces wear and tear between first protrusion array and first depression array when housing elements 111a and 111b are engaged. In some embodiments, insert 196 may be built into (and an integral feature of) a housing element as opposed to an independent component. In some embodiments, insert 196 may be made of rubber, plastic polymer, or the like.

In some embodiments, the rod holder assembly may further comprise a locking mechanism 125 that provides additional compressive force of the resilient member 119 and between housing elements 111a, 111b and their respective horizontal protrusion and horizontal depression arrays. When said locking mechanism is fully activated, rotational motion about the horizontal axis 109 as between the housing elements is substantially prevented. This locking position may be accomplished by resilient member compression and/or a reduction in travel between components within the locking mechanism. Further, in some embodiments, the assembly may be fully locked without resilient member interaction through said locking mechanism. This may be done by taking up sufficient travel between components such that 111a and 111b cannot be pulled apart sufficiently to change the angle.

In some embodiments, such as that shown in FIG. 2, locking mechanism 125 may comprise a shaft 126 with a first end 127 (not shown in this figure) and a second end 128 that passes through (or substantially through) first gear assembly 107. In the embodiment illustrated in FIG. 2, shaft 126 may pass through a first aperture 129 in housing element 111a, through a first channel 130, through second aperture 131 in housing element 111b, through a second channel 132 (first and second channel and first and second aperture are not clearly visible in this illustration) and into a locking receptacle 133 engaged with shaft 126 proximate second aperture 131 of housing element 111b. In one embodiment, the second end of shaft 126 comprises one or more locking protrusions 134 (e.g., a through pin, etc.) that interact with complementary locking channels and/or apertures 135 in receptacle 133. Locking channels 135 are best illustrated in FIG. 2C. Receptacle 133 (or shaft 126) may be turned clockwise and/or counterclockwise which causes the protrusions to travel through locking channels 135 in a manner that pulls shaft 126 toward receptacle 133 resulting in tighter interaction between first protrusion array 113 and first depression array 116 on housing elements 111a, 111b. The locking channels 135 may comprise multiple locking positions dictated by recesses within the receptacle 131 along locking channels such that a slight turn of receptacle 133 (or shaft) to first position results in tension sufficient enough to hold the rod receiver 101 in place under normal strain, but allow rotation when stronger external forces are experienced. A second lock position may be obtained, for example, by the user rotating the receptacle knob 136 further though channel to a second recess, resulting even greater tension between first depression array and first protrusion array such that rotation about the horizontal axis 109 is substantially prohibited or impossible.

One of ordinary skill in the art will appreciate that various locking mechanisms may be used. For example, FIG. 3 illustrates an embodiment wherein a ball detent pin 137 is used in conjunction with a ball detent receiver 138 that, in some embodiments, comprises a push button dual position receiver. FIG. 4 illustrates another embodiment employing a threaded shaft 139 and cam lever 140. FIG. 5 illustrates yet another embodiment depicting an alternative embodiment of the threaded shaft 141 and cam lever 142 design whereby the threaded shaft is a screw inserted through one side of the first gear assembly 107 and affixed to the cam lever 142 on the opposite side of the first gear assembly 107. In the embodiment shown in FIG. 5, a user may push lever 142 toward housing element 111b thus pushing threaded shaft (to which it is engaged) and compressing resilient member 119. In some embodiments, this action is used to release and disengage housing elements 111a and 111b allowing the user to swap out housing element 111a as needed. FIG. 9 illustrates yet another embodiment wherein shaft 126 with locking protrusions 134 (e.g., formed by through pin as shown) may be inserted through second aperture 131 and follows the reverse path described in the above embodiment illustrated by FIG. 2. In this embodiment, shaft 126 engages a locking chamber 143 of housing element 111a which may comprise locking channels and/or apertures similar to those provided in receptacle 133. Shaft 126 may comprise a turn knob 144 at the opposite end from locking protrusions 134 with, for example, a turn-dial 145 used to rotationally manipulate shaft 126. Aspects of each locking mechanism design may be combined for these purposes.

In some embodiments, locking mechanism 125 utilizes resilient member 119 compression and/or a reduction in the amount of travel or space between locking mechanism components to lock the assembly—substantially prohibiting rotational movement about the horizontal axis. For example, in the embodiment shown in FIG. 2A, a turn of the shaft 126 or receptacle 133 to the second locking position within locking channels, causes the left face of receptacle 133 to engage or nearly engage the internal ledge 123 of resilient member retention element 120 substantially prohibiting disengagement of first protrusion and depression arrays. In some embodiments, locking mechanism may work without the need for resilient member compression.

As discussed previously, the rod holder assembly 100 may comprise a second gear assembly 108. In some embodiments, the second gear assembly 108 governs movement of the rod holder assembly 100 about the vertical axis, which is defined in this embodiment by dotted line 110. In one embodiment, the second gear assembly 108 functions and is mechanically similar (or identical) to the first gear assembly 107 described in detail above. For example, in the embodiment illustrated in FIG. 2, second gear assembly 108 comprises a protrusion array 146 and a depression array 147 (not shown), namely for second gear assembly "second protrusion array" and "second depression array" respectively. In one embodiment, second gear assembly 108 rotates about a vertical axis 110—360 degrees. This design incorporates the various adjustability designs to allow the rod receiver to be rotatably adjusted about the vertical axis using a single handed pull/rotate/release substantially synchronous motion for adjustment of either or both horizontal and vertical axes.

In some embodiments, the second protrusion array 146 (not shown) may be located on a bottom surface or face 148 of housing element 111b. As shown in FIGS. 2-4 and 9, second depression array 147 may be located on an upper surface of mounting platform 149 that may additionally function as part of a mounting mechanism described in more detail below. In an alternative embodiment (not shown on any figure), however, protrusion array 146 is positioned about a substantially vertical surface of a shaft extending from bottom face 148 of housing element 111b. Likewise depression array may be positioned within a chamber within platform 149 for receiving complementary protrusions. This substantially vertical protrusion/depression and shaft configuration may offer increased resistance to torque about the vertical axis.

Second depression array 147 and second protrusion array 146 cooperate much the same as first depression array 116 and first protrusion array 113 described above. Second gear assembly 108 may also comprise a resilient member 150 (namely "second resilient member") which, in the embodiment shown in FIG. 2, is a vertical axis spring. Second resilient member 150 may rest upon a resilient member retention element 151. The resilient member retention element 151 may provide a surface for the second resilient member 150 to expand and compress for adjustability of the torque on the vertical rotation. In some embodiments, the resilient member retention element 151 comprises a threaded shaft 152 and a resilient member support 153. The threaded shaft, as shown in the embodiment illustrated in FIG. 2A (for example), is inserted into an aperture 154 and chamber 155 contained within mounting platform 149. Threaded shaft 152 engages a complementary female receiving portion at the bottom of housing element 111b. The entire second gear assembly 108 may be secured to the intended mounting surface together by nut 156 which engages a threaded hub 157 on the underside of mounting platform 149 as shown in the embodiment illustrated in FIG. 2. In operation, as the user lifts up on rod receiver 101 and disengages second protrusion array 146 from second depression array 148, resilient member 150 compresses creating coiled tension. Upon release, resilient member 150 expands pulling platform 149 and bottom face 148 back together. The embodiment depicted in FIG. 2A illustrates an embodiment of a mounting mechanism for the rod holder assembly, specifically a mount design whereby platform 149 is secured to a boat deck or other suitable surface with screws or bolts driven through apertures 158 positioned about the perimeter of platform 149. Other components may be used to mount the assembly as well such as the threaded nut attached to the deck of a boat.

Figure 6A:
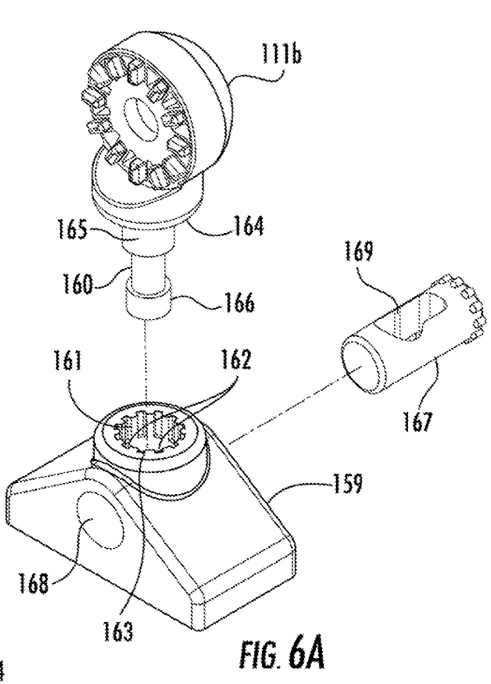
FIG. 6A-B illustrates an embodiment of a mounting mechanism.
Figure 6B:
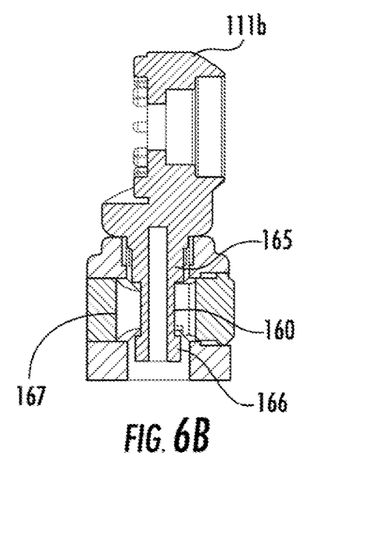

As mentioned above, the rod holder assembly 100 may comprise various mounting mechanisms. For example, FIG. 2 illustrates the mounting mechanism described above. FIG. 6A-B illustrates another variation of a mounting mechanism for the rod holder assembly 100. The embodiment shown in FIG. 6A-B is a mechanism configured to secure the rod holder assembly 100 to the deck of a boat, or any stable, flat surface. In this embodiment, the mounting mechanism comprises an anchor 159 that attaches to the mounting surface. Suitable fasteners for attaching the anchor portion 159 to the mounting surface may include, without limitation, bolts, adhesives, magnets, and frictional fittings. The anchored rod holder assembly 100 is advantageous in that it provides an anchor portion 159 having a wide base for maintaining optimal stability while holding a fishing rod or other fishing related item on the rod receiver 101.

FIG. 6B illustrates sectioned views of the mounting mechanism embodiment illustrated in FIG. 6A, detailing an exemplary anchor portion 159 and a shaft 160. As shown in FIG. 6A, the anchor portion 159 comprises a gear element 161 which, in this embodiment, is a cavity 162 comprising an array of channels 163 (e.g., depressions) about the perimeter of interior vertical surface of cavity 162 which receive complementary protrusions positioned, in this embodiment, about the bottom surface 164 of housing element 111b about the perimeter of the base 165 of shaft 160. Shaft 160 may further comprise a locking cylinder 166 at the opposite end from base 165. The mounting mechanism illustrated in FIG. 6A, further comprises a lock receptacle 167 which inserts within channel 168 of anchor portion 159. Lock receptacle 167 may comprise a slot 169 and chamber 170 for receiving shaft 160 and locking cylinder 166. Lock receptacle 167 is shown in more detail in FIG. 8. Chamber 170 comprises a channel 171 for initial introduction of shaft 160 into receptacle 167, first lock surface 172 and second lock surface 173. As shaft 160 moves further into channel 171 and locking cylinder 166 reaches a predetermined depth, the user may push this lock receptacle further into channel 171 thereby engaging locking cylinder 166 with first lock surface 172. This first position allows the user to pull up on the housing element 111b to disengage the protrusions and depressions (second gear assembly) and rotate rod receiver about the vertical axis. If shaft 160 is pushed down further and reaches another certain depth the user may push receptacle over even further into channel 171 thereby engaging locking cylinder 166 with second lock surface 173. This second position is a full lock position preventing user from vertically moving the shaft 160 and rod receiver upwards.

Figures 7A, 7B:
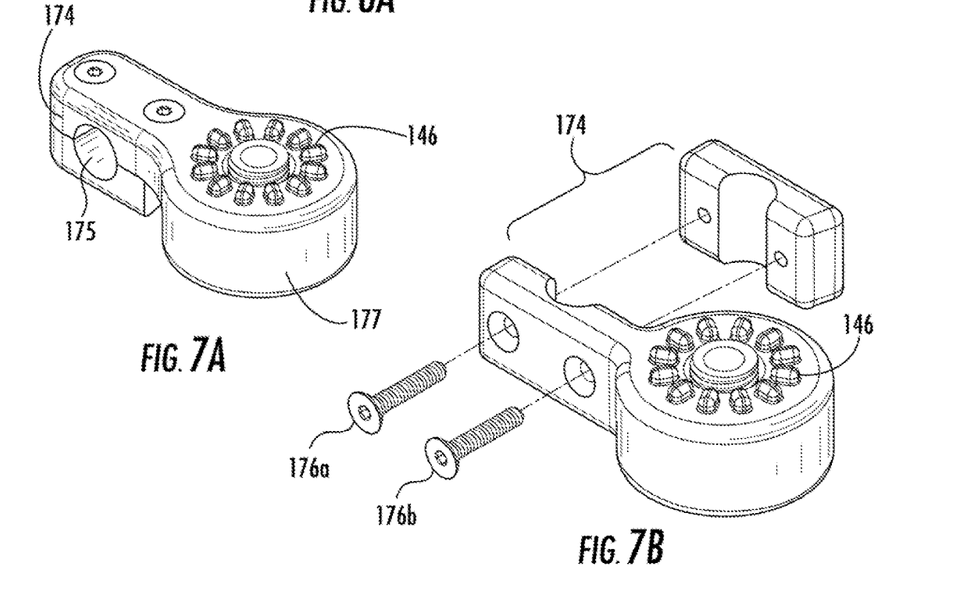
FIG. 7A-B illustrates an embodiment of a mounting mechanism.
Figure 8A:
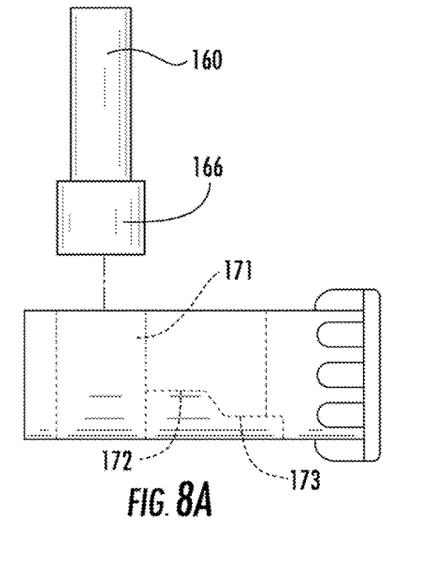
FIG. 8A-E illustrates more detailed view of an embodiment of the locking receptacle shown in FIG. 6A-B.
Figure 8B:
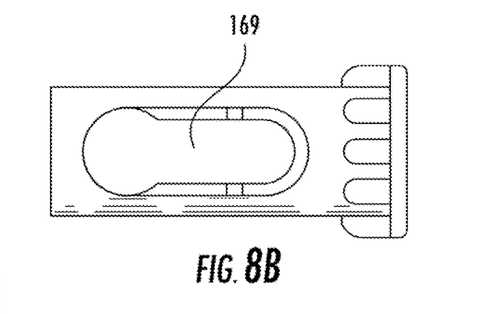
Figure 8C:
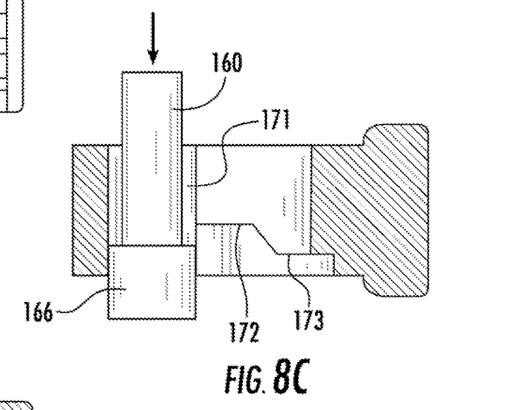
Figure 8D:
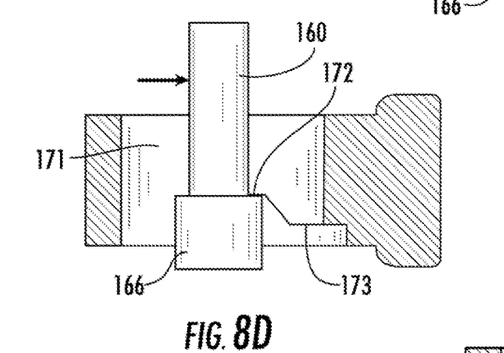
Figure 8E:
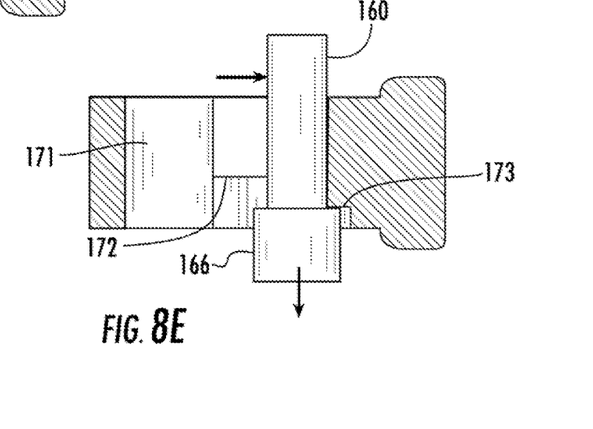

FIG. 7A-B illustrates a perspective view of an exemplary mounting mechanism for a rod holder assembly 100 capable of mounting to a rail or bar. In this embodiment, the mounting mechanism may comprise a bracket 174 having a channel 175 that receives a cylindrically shaped rail or pole. Channel 175 is sized and dimensioned to receive a vertically or horizontally disposed pole, such as a flag pole, a railing of a boat, or a utility pole on a deck or boat. In the embodiment illustrated in FIG. 7B, a pair of screws 176a, 176b may be used to clamp and tighten bracket 174 around a rail. In one embodiment, a platform 177 may be attached to bracket 174 and comprise a second protrusion array 146 or depression array 147 in second gear assembly 108 as described above.

Figure 10A:
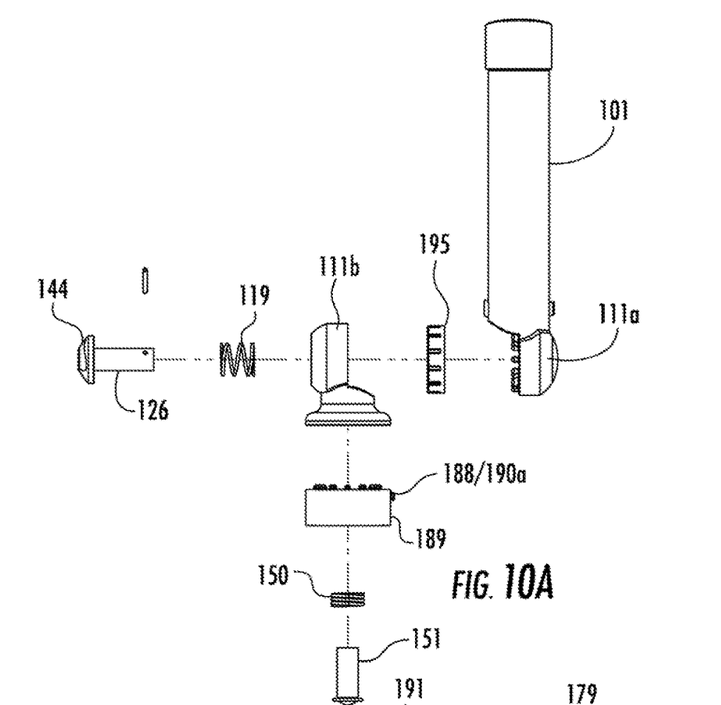
FIG. 10A-C illustrates an embodiment of an adjustable fishing rod holder assembly with an alternative mounting mechanism design.
Figure 10B:
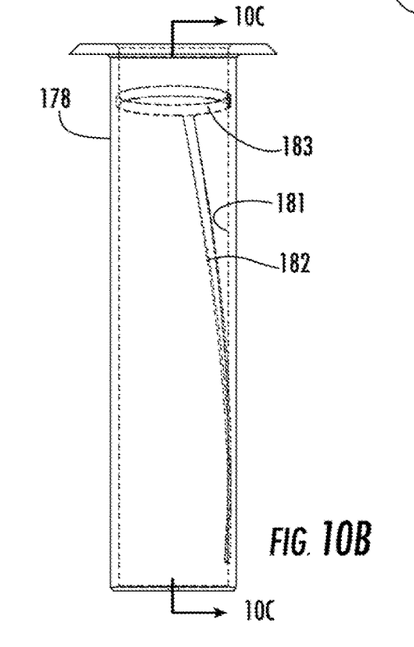
Figure 10C:
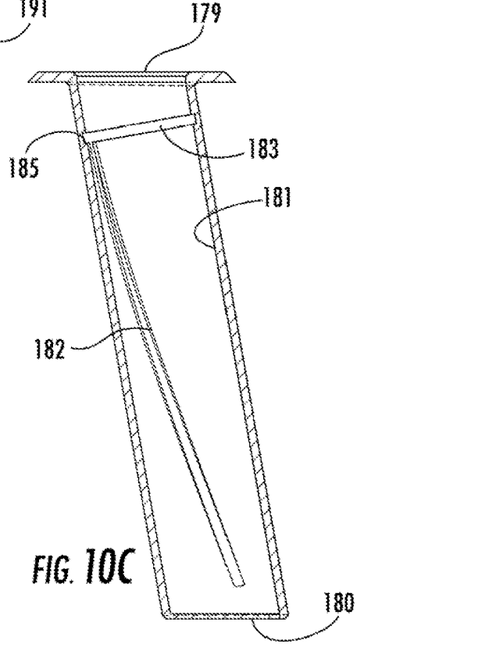
Figure 11:
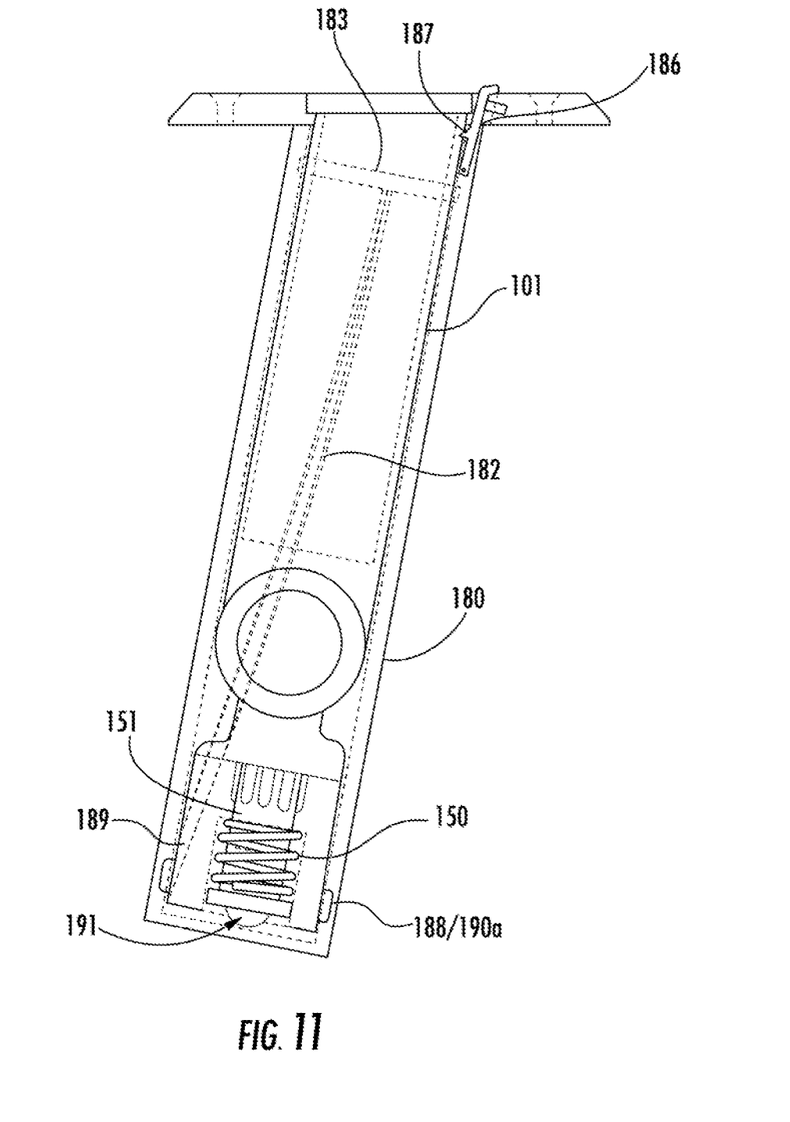
FIG. 11 illustrates an embodiment of the mounting mechanisms shown in FIG. 10 with the rod receiver in a retracted position.

FIG. 10 illustrates yet another embodiment of a mounting mechanism for the rod holder assembly 100. The depicted embodiment comprises a rod receiver main housing 178 which is of sufficient size to contain the main components of a rod holder assembly 100, for example, the rod receiver, first gear assembly, and second gear assembly. The rod receiver main housing 178 enables the rod holder assembly 100 to be substantially concealed in the main housing when fully retracted. When activated and fully extended, the rod holder assembly 100 is fully visible and accessible to the user. In this manner, the rod receiver main housing 178 provides greater possibilities of positioning, orientation, and attachment capacity to the rod holder assembly 100. Second gear assembly's components are comparable to prior discussed embodiments. For example, second gear assembly may comprise resilient member 150 and resilient member retention element 151 which supports resilient member and is affixed to housing element 111b.

The rod receiver main housing 178 may comprise an elongated cylinder having a diameter slightly larger than the rod receiver 101 and the remaining components of the rod holder assembly 100. The rod receiver main housing 178 may be defined by an open end 179 and a closed end 180. Main housing 178 may comprise an inner surface 181 that includes an internal channel 182. In one embodiment, an internal channel 182 travels substantially diagonally across the main housing inner surface as shown in FIG. 10A-B until it reaches a point proximate open end 179 where it turns at a sharp angle (about 80 degrees in one embodiment) to form locking channel 183. Locking channel 183 may be tapered (narrower) toward terminus 184. In one embodiment, locking channel 183 may comprise a locking node 185 at the terminus that serves as a stop for guide post knob (discussed below) preventing further movement of the rod holder assembly 100 without a substantial amount of user force applied. In one embodiment, a lever 186 and a release tab 187 provide a mechanism for fastening the rod holder assembly 100 in a fully retracted position within main housing 178.

The rod receiver main housing 178 may be configured to receive a rod holder assembly 100 having a guide post 188, in this embodiment positioned and engaged to platform 149 on its side surface 189. In one embodiment, guide post 188 may comprise two knobs 190a, 190b on opposite sides of platform 149. In another embodiment, there may be a single knob 190, such as the embodiment shown in FIGS. 9 and 10. The guide post 188 may ride the internal channel 182, such that the rod holder assembly 100 uniformly slides up and down the main housing 178 in a twisting disposition and proper elevated positioning. As shown in FIGS. 9 and 10, the rod holder assembly 100 may travel up the main housing 178 via interaction between guide post knob 190 along the internal channel 182. In one embodiment, engagement of guide post knob 190 with locking node 185 locks the rod holder assembly 100 in an upper most or elevated position. Once in the upper most locked position, the first gear assembly 107 and second gear assembly 108 may operate to orient the rod receiver 101 as desired. It should be understood by one of ordinary skill in the art that any number of suitable mechanisms may be employed to promote proper vertical movement of rod holder assembly 100 within main housing 178 and locking the rod holder assembly 100 in an elevated position. In some embodiments, for example, the channel 183, guide post 188, knob 190 configuration may be replaced with another mechanism that achieves that desired end.

In some embodiments of the mount mechanism illustrated in FIG. 10, the resilient member retention element 151 may comprise a bumper 191 positioned to engage the bottom of the main housing 178. When the lever 186 is pressed and releases tab 187 bumper and resilient member 150 are activated to slightly push the rod holder assembly 100 upward thereby exposing enough of the top portion of the rod receiver 101 for the user to grab and continue to pull the rod holder assembly 100 upward.

In operation, a user of the rod holder assembly may grip the rod receiver and/or housing element 111a, pull up to disengage second protrusion array from second depression array, rotate the rod holder assembly about the vertical axis and release. With the same hand and substantially synchronously, the user may disengage first protrusion array from first depression array by pulling rod receiver in a horizontal direction. The user may then change the angle α of the rod receiver to a desired position and then release thus reengaging first protrusion array with first depression array. Once the user has achieved the desired angle and direction, depending on the locking mechanism employed, the user may then turn the receptacle knob or press the cam lever to lock the assembly in place substantially preventing an unwanted change in receiver orientation.

If the user wishes to convert the rod holder assembly to a mount for another object or another rod receiver the user may grip the rod holder receiver, activate a first housing element release, completely disengage the first housing element from the second housing element, replace the first housing element with a substitute housing element, and mount a desired object on said substitute housing element (as needed) on the replacement or substitute null mount housing element.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A rod holder assembly comprising:
    a rod receiver for supporting a fishing rod;
    a first gear assembly engaged to the rod receiver and governing rotational movement of the rod receiver about a horizontal axis comprising a first housing element, a second housing element, a first resilient member, and a first resilient member retention element;
    wherein the first housing element comprises a first protrusion array affixed to a lateral face of the first housing element and wherein the second housing element comprises a first depression array affixed to a lateral face of the second housing element;
    a second gear assembly governing rotational movement of the rod receiver about a vertical axis comprising a platform engaged to and supporting at least one of said housing elements of the first gear assembly, a second resilient member, a second resilient member retention element, a second protrusion array, and a second depression array; and
    a locking mechanism comprising at least a first lock setting and a second lock setting whereby said first lock setting allows rotational movement about the horizontal axis in response to an external force and said second lock setting substantially prohibits rotational movement about the horizontal axis in response to an external force.

2. The rod holder assembly of claim 1 wherein said second gear assembly allows for a degree of rotation about the vertical axis in response to an external force.

3. The rod holder assembly of claim 1 wherein said first and second protrusion arrays and said first and second depression arrays form a substantially circular pattern.

4. The rod holder assembly of claim 1 wherein said first gear assembly further comprises a shock dampening element.

5. The rod holder assembly of claim 4 wherein said shock dampening element comprises a third depression array comprising a plurality of depressions and a third protrusion array comprising a plurality of protrusions.

6. The rod holder assembly of claim 5 wherein the first protrusion array comprises a plurality of protrusions that mate with the plurality of depressions on the third depression array.

7. The rod holder assembly of claim 6 wherein the first depression array comprises a plurality of depressions that mate with the plurality of protrusions on the third depression array of the shock dampening element.

8. The rod holder assembly of claim 1 wherein said first and second resilient members are springs.

9. The rod holder assembly of claim 1 wherein said locking mechanism comprises a shaft comprising locking protrusions and a channeled locking receptacle for receiving said shaft.

10. The rod holder assembly of claim 9 wherein said locking mechanism substantially prohibits rotation about the horizontal axis through a combination of first resilient member compression and substantial engagement between locking receptacle and first resilient member retention element.

11. The rod holder assembly of claim 9 wherein said locking mechanism substantially prohibits rotation about the horizontal axis through first resilient member compression.

12. The rod holder assembly of claim 9 wherein said locking mechanism substantially prohibits rotation about the horizontal axis through substantial engagement between locking receptacle and first resilient member retention element.

13. The rod holder assembly of claim 1 wherein said locking mechanism comprises a ball detent and ball detent receiver.

14. The rod holder assembly of claim 1 wherein said locking mechanism secures first gear assembly alone.

15. The rod holder assembly of claim 1 further comprising a mounting mechanism.

16. The rod holder assembly of claim 15 wherein said mounting mechanism comprises a threaded shaft affixed to a bottom surface of the platform and a nut for securing to said threaded shaft.

17. The rod holder assembly of claim 1 further comprising a first housing element release mechanism wherein said first housing element may be fully detached from rod holder assembly and replaced with a substitute housing element.

18. The rod holder assembly of claim 1 wherein the locking mechanism further comprises a cam follower assembly.

19. The rod holder assembly of claim 18 wherein the cam further comprises a sloped locking channel comprising one or more slots at one or more positions along the locking channel.

20. The rod holder assembly of claim 19 wherein the follower further comprises a pin for engaging said locking channel and one or more slots.

21. A rod holder assembly comprising:
    a rod receiver for supporting a fishing rod;
    a first gear assembly engaged to the rod receiver and governing rotational movement of the rod receiver about a horizontal axis comprising a first protrusion array, a first depression array, a first resilient member, and a first resilient member retention element;
    a second gear assembly governing rotational movement of the rod receiver about a vertical axis comprising a platform engaged to and supporting at least one of said housing elements of the first gear assembly, a second protrusion array and a second depression array a second resilient member, and a second resilient member retention element;
    wherein said first and second protrusion and said first and second depression arrays form a substantially circular pattern; and
    a locking mechanism comprising at least a first lock setting with base torque resistance and base tension between the first depression array and the first protrusion array due to compression of first resilient member, and a second lock setting with elevated torque resistance and elevated tension between the first depression array and the first protrusion array.

22. The rod holder assembly of claim 21 wherein said first protrusion array is positioned on said resilient member retention element.

23. The rod holder assembly of claim 21 wherein said first and second resilient members are springs.

24. The rod holder assembly of claim 21 wherein the locking mechanism further comprises a cam follower assembly.

25. The rod holder assembly of claim 24 wherein the cam further comprises a sloped locking channel comprising one or more slots at one or more positions along the locking channel.

26. The rod holder assembly of claim 25 wherein the follower further comprises a pin for engaging said locking channel and one or more slots.

27. A method of adjusting a rod holder assembly comprising the steps of:
   providing a rod holder assembly comprising a rod receiver for supporting a fishing rod;
   a first gear assembly engaged to the rod receiver and governing rotational movement of the rod receiver about a horizontal axis comprising a first housing element, a second housing element, a first resilient member, and a first resilient member retention element;
   wherein the first housing element comprises a first protrusion array affixed to a lateral face of the first housing element and wherein the second housing element comprises a first depression array affixed to a lateral face of the second housing element;
   a second gear assembly governing rotational movement of the rod receiver about a vertical axis comprising a platform engaged to and supporting at least one of said housing elements of the first gear assembly, a second resilient member, a second resilient member retention element, a second protrusion array, and a second depression array; and
   a locking mechanism comprising at least a first lock setting and a second lock setting whereby said first lock setting allows rotational movement about the horizontal axis in response to an external force and said second lock setting substantially prohibits rotational movement about the horizontal axis in response to an external force;
   gripping the rod holder receiver and pulling said receiver along the horizontal axis to disengage said first housing element from said second housing element;
   simultaneously pulling said receiver upward along the vertical axis to disengage said second housing element from said platform;
   pushing said rod receiver forward or backward to adjust the rod receiver's angle in relation to the horizontal plane;
   twisting said rod receiver about a 360 degree vertical axis to adjust the rod receiver's directional orientation; and
   releasing said rod holder receiver to reengage first housing element with second housing element and second housing element with platform.

* * * * *